US009263932B2

(12) United States Patent
Ito

(10) Patent No.: US 9,263,932 B2
(45) Date of Patent: Feb. 16, 2016

(54) DC-DC CONVERTER

(71) Applicant: Asahi Kasei Microdevices Corporation, Tokyo (JP)

(72) Inventor: Satoru Ito, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 22 days.

(21) Appl. No.: 14/346,358

(22) PCT Filed: Apr. 26, 2013

(86) PCT No.: PCT/JP2013/002865
§ 371 (c)(1),
(2) Date: Mar. 21, 2014

(87) PCT Pub. No.: WO2013/179571
PCT Pub. Date: Dec. 5, 2013

(65) Prior Publication Data
US 2014/0375295 A1    Dec. 25, 2014

(30) Foreign Application Priority Data

Jun. 1, 2012    (JP) .................................. 2012-126032

(51) Int. Cl.
*H02M 3/156*    (2006.01)
*H02M 1/00*    (2007.01)
(Continued)

(52) U.S. Cl.
CPC .......... *H02M 1/00* (2013.01); *H02M 3/06* (2013.01); *H02M 3/156* (2013.01); *H02M 3/158* (2013.01);
(Continued)

(58) Field of Classification Search
CPC .......... H02M 1/42; H02M 2003/1552; H02M 1/4225
USPC .................. 323/222, 270–285, 299, 205, 237
See application file for complete search history.

(56) References Cited

U.S. PATENT DOCUMENTS 7,193,871 B2 * 3/2007 Mashiko .......................... 363/79
7,279,876 B2 * 10/2007 Adragna et al. .............. 323/284
(Continued)

FOREIGN PATENT DOCUMENTS

JP    2006-204022 A    8/2006
JP    2007-189795 A    7/2007
JP    2010-174721 A    8/2010

OTHER PUBLICATIONS

International Search Report issued in corresponding International Patent Application No. PCT/JP2013/002865 dated Jun. 18, 2013.
(Continued)

*Primary Examiner* — Timothy J Dole
*Assistant Examiner* — Bryan R Perez
(74) *Attorney, Agent, or Firm* — Morgan, Lewis & Bockius LLP

(57) ABSTRACT

A DC-DC converter includes: an error amplifier for outputting an error between an output voltage and a predetermined voltage; a phase compensation impedance element for accumulating the error across one end to generate an error phase; a determination unit for determining whether the voltage output by the error amplifier is higher, or lower than a reference voltage that is consonant with the predetermined voltage, and outputting a determination signal indicating determination results; and a voltage setting unit for setting a voltage for one end of the phase compensation impedance element higher than a lower output voltage limit for the error amplifier when the determination signal indicates that the voltage output by the error amplifier is lower than the reference voltage, or for canceling setting of the voltage when the determination signal indicates that the voltage output by the error amplifier is higher than the reference voltage.

14 Claims, 13 Drawing Sheets

(51) Int. Cl.
  *G05F 1/67* (2006.01)
  *G05F 5/00* (2006.01)
  *H02M 3/06* (2006.01)
  *H02M 3/158* (2006.01)
  *G06F 5/00* (2006.01)

(52) U.S. Cl.
  CPC ... *G05F 1/67* (2013.01); *G06F 5/00* (2013.01); *H02M 2001/0022* (2013.01); *H02M 2001/0025* (2013.01); *Y02B 70/126* (2013.01); *Y02E 10/58* (2013.01)

(56) References Cited

U.S. PATENT DOCUMENTS

| | | | |
|---|---|---|---|
| 7,294,994 B2 | 11/2007 | Ryu et al. | |
| 7,638,994 B2* | 12/2009 | Hane et al. | 323/285 |
| 7,759,911 B2* | 7/2010 | Omi | 323/222 |
| 7,868,602 B2* | 1/2011 | Omi et al. | 323/284 |
| 8,102,165 B2* | 1/2012 | Gu et al. | 323/285 |
| 8,212,539 B2* | 7/2012 | Osaka | 323/272 |
| 2004/0095101 A1* | 5/2004 | Pidutti et al. | 323/222 |
| 2007/0182397 A1 | 8/2007 | Deguchi | |
| 2007/0236188 A1* | 10/2007 | Gibson et al. | 323/225 |
| 2009/0303751 A1* | 12/2009 | Usui | 363/15 |
| 2010/0109626 A1* | 5/2010 | Chen | 323/282 |
| 2010/0188874 A1* | 7/2010 | Sato et al. | 363/21.18 |
| 2011/0187339 A1* | 8/2011 | Trattler et al. | 323/283 |
| 2011/0254524 A1* | 10/2011 | Ishii | 323/282 |
| 2012/0169313 A1* | 7/2012 | Lee et al. | 323/282 |

OTHER PUBLICATIONS

International Preliminary Report on Patentability issued in corresponding International Patent Application No. PCT/JP2013/002865 dated Dec. 11, 2014.

Written Opinion issued in corresponding International Patent Application No. PCT/JP2013/002865 dated Jun. 18, 2013.

* cited by examiner

DC-DC CONVERTER

TECHNICAL FIELD

The present invention relates to a DC-DC converter employed for a power supply for an electronic apparatus, and relates particularly to a DC-DC converter that sets bypass mode when an input voltage is higher than a predetermined voltage, or sets boost mode when an input voltage is lower than the predetermined voltage.

BACKGROUND ART

Recently, as global awareness of environmental preservation has increased, environmentally-friendly vehicles have been actively introduced to the automobile market. Above all, attentions have been drawn to energy-efficient green vehicles, equipped with idle reduction systems, that provide higher fuel efficiency at lower costs than hybrid vehicles.

The idle reduction system is a system that automatically shuts off the engine of a vehicle when the vehicle stops at traffic lights or railroad crossings, and that improves fuel efficiency by about 10%. Further, it is predicted that automobiles practically equipped with the idle reduction mechanism will be increased in order to cope with global warming and emission regulations.

For the idle reduction equipment vehicle that includes the idle reduction system, the engine starts while the electrical system is currently operated, and a voltage drop at the battery occurs due to the generation of the initial inrush current of the cell motor that is used to start the engine.

That is, in the idle reduction system, since the cell motor requires a large amount of current of the battery for starting the engine, a battery voltage may be dropped to cause erroneous operation of the electronic devices.

In order to supply a voltage and a current necessary for the operation of the electronic devices even in the voltage drop condition of the battery, a boost DC-DC converter is required.

Furthermore, in order to increase efficient energy use for an on-vehicle DC-DC converter, it is required that a battery and an alternator (electrical generator) be employed as power supplies. In other words, it is requested that as a power supply, the on-vehicle DC-DC converter employ the alternator when the engine is operated, or employ the battery during the idle reduction period. The alternator performs power generation by employing the revolutions of the drive shaft when the engine is operated, and generates a voltage higher than the voltage of the battery.

FIG. 1 is a circuit diagram for a conventional DC-DC converter.

Referring to FIG. 1, a conventional DC-DC converter 100 is a DC-DC converter that sets either bypass mode in which, when an input voltage $V_{IN}$ is higher than a predetermined voltage, the input voltage $V_{IN}$ is output, unchanged, as an output voltage $V_O$, or sets boost mode in which, when the input voltage $V_{IN}$ is lower than the predetermined voltage, the input voltage $V_{IN}$ is increased to the predetermined voltage level, and the obtained voltage is output as an output voltage $V_O$. That is, the conventional DC-DC converter 100 sets the bypass mode when an alternator is employed as a power supply, or sets the boot mode when a battery is employed as a power supply.

The DC-DC converter that switches between the bypass mode and the boot mode in this manner is described in, for example, patent literature 1.

In the conventional DC-DC converter 100, when the input voltage $V_{IN}$ is higher than a predetermined voltage that is a desired output voltage, a comparator 102 outputs an active-low signal as a reset signal to a latch circuit 112, which then outputs an active-low signal to an NMOS. Sequentially, the NMOS is rendered off to establish an electrical connection between the input terminal and the output terminal, and the input voltage $V_{IN}$ is output unchanged as the output voltage $V_O$.

Furthermore, when the input voltage $V_{IN}$ is lower than the predetermined voltage, the latch circuit 112 outputs to the NMOS a PWM signal having a duty cycle that corresponds to a load $R_L$, and the NMOS performs switching. Since a current having a triangular waveform flows across a coil L, the voltage across a sense resistor $R_S$ becomes a voltage with a triangular waveform (a ramp waveform). An error amplifier 103 outputs an error between a voltage FB, obtained by dividing the output voltage $V_O$ by using resistors R1 and R2, and a reference voltage $V\_{FB\_REF}$ that corresponds to the predetermined voltage, and a phase compensation impedance element Z accumulates the error and generates an error voltage. Further, the phase compensation impedance element Z also performs phase compensation for the feedback loop of the DC-DC converter. The comparator 102 receives the error voltage, and compares this voltage with the triangular wave voltage. Then, the comparator 102 outputs a reset signal, for which the active-low period is consonant with the error voltage, and the latch circuit 112 outputs a PWM signal having a duty cycle that is consonant with the error voltage.

CITATION LIST

Patent Literature

PTL 1: Japanese Patent Laid-Open No. 2010-174721

SUMMARY OF INVENTION

Technical Problem

However, there is a problem for the conventional DC-DC converter 100 in FIG. 1 that a large undershoot occurs when the bypass mode is changed to the boost mode.

Specifically, for the conventional DC-DC converter 100, the voltage output by the error amplifier 103 is clamped at the ground level (the ground voltage) in the bypass mode, and therefore, the phase compensation impedance element Z generates an error voltage, at which the performance of the boosting operation is most discouraged, i.e., the error voltage at which the load becomes minimum. When the error voltage, at which the performance of the boosting operation is most discouraged, is generated in the bypass mode, a longer period would be required until the error voltage becomes zero when the bypass mode is changed to the boost mode, and during this period, the switching operation consonant with a load current can not be performed, and therefore, a large undershoot occurs.

While resolving this problem, one objective of the present invention is to provide a DC-DC converter that can reduce the undershoot that occurs when bypass mode is changed to boost mode.

Solution to Problem

A DC-DC converter according to claim 1 of the present invention is characterized by comprising: an error amplifier for outputting an error between an output voltage and a predetermined voltage; a phase compensation impedance element for performing phase compensation, and for accumulating the error across one end to generate an error voltage; a determination unit for monitoring a voltage output of the error amplifier to determine whether the voltage output of the error amplifier is higher, or lower than a reference voltage according to the predetermined voltage, and for outputting a determination signal indicating results of the determination; and a voltage setting unit for setting a voltage at one end of the phase compensation impedance element higher than a lower output voltage limit of the error amplifier when the determination signal indicates that the voltage output of the error amplifier is lower than the reference voltage, or for canceling the setting of the voltage when the determination signal indicates that the voltage output of the error amplifier is higher than the reference voltage.

The DC-DC converter according to claim 2 of this invention is characterized by: setting, when an input voltage applied at an input terminal is higher than the predetermined voltage, a bypass mode of outputting the input voltage, unchanged, from an output terminal as an output voltage; and setting, when the input voltage is lower than the predetermined voltage, a boost mode of increasing the input voltage and outputting the output voltage from the output terminal.

The DC-DC converter according to claim 3 of this invention is characterized in that, in the bypass mode, the voltage setting unit sets a voltage at one end of the phase compensation impedance element, either equal to, or higher than a voltage at the other end.

The DC-DC converter according to claim 4 of this invention is characterized in that, in the bypass mode, the voltage setting unit establishes a short circuit between both ends of the phase compensation impedance element, and in the boost mode, cancels the short circuit.

The DC-DC converter according to claim 5 of this invention is characterized in that the voltage setting unit includes: a first latch circuit for receiving the determination signal at a set terminal, and for outputting a first output signal and a second output signal having an opposite polarity of the first output signal; a first switch, connected between an output terminal of the error amplifier and one end of the phase compensation impedance element, for receiving the second output signal and the first switch is turned on when the second output signal have the same polarity as that of the determination signal, or is turned off when the second output signal has an opposite polarity of the determination signal; and a second switch, connected between one end and the other end of the phase compensation impedance element, for receiving the first output signal and the second switch is turned on when the first output signal has the same polarity as that of the determination signal, or is turned off when the second output signal has an opposite polarity of the determination signal.

The DC-DC converter according to claim 6 of this invention is characterized in that the voltage setting unit includes: a first latch circuit for receiving the determination signal at a set terminal, and for outputting a first output signal and a second output signal having an opposite polarity of the first output signal; a first switch, connected between an output terminal of the error amplifier and one end of the phase compensation impedance element, for receiving the second output signal and the first switch is turned on when the second output signal have the same polarity as that for the determination signal, or is turned off when the second output signal has an opposite polarity of the determination signal; and a second switch, connected between one end of the phase compensation impedance element and a voltage source for generating a voltage to be set at the one end in the bypass mode, for receiving the first output signal and the second switch is turned on when the first output signal has the same polarity as that of the determination signal, or is turned off when the second output signal has an opposite polarity of the determination signal.

The DC-DC converter according to claim 7 of this invention is characterized in that the determination unit includes: a first comparator, for comparing a voltage output by the error amplifier with the reference voltage, and for outputting, when the voltage output by the error amplifier is lower than the reference voltage, the determination signal indicating that the bypass mode is currently set, or outputting, when the voltage output by the amplifier is higher than the reference voltage, the determination signal indicating that the boost mode is currently set.

The DC-DC converter according to claim 8 of this invention is characterized by further comprising: a PWM signal generator for outputting a PWM signal having a duty cycle according to the error voltage, wherein in the boost mode a switching operation is performed based on the PWM signal.

The DC-DC converter according to claim 9 of this invention is characterized in that the PWM signal generator includes: a second comparator for comparing, with the error voltage, a voltage that corresponds to an input current that flows at the input terminal, and for outputting a reset signal when the error voltage is higher than the voltage that corresponds to the input current; and a second latch circuit for receiving a clock at a set terminal and receiving the reset signal at a reset terminal to output the PWM signal, and for outputting, to a reset terminal of the first latch circuit, a signal having polarity opposite to that of the PWM signal.

The DC-DC converter according to claim 10 of this invention is characterized in that the phase compensation impedance element includes resistors connected in series and a capacitor.

A DC-DC converter according to claim 11 of this invention, which sets, when an input voltage input at an input terminal is higher than a predetermined voltage, bypass mode for outputting the input voltage, unchanged, from an output terminal as an output voltage, or sets, when the input voltage is lower than the predetermined voltage, boost mode for increasing the input voltage and outputting the output voltage from the output terminal, is characterized by comprising: an error amplifier for outputting an error between the output voltage and the predetermined voltage; a phase compensation impedance element for performing phase compensation, and for accumulating the error across one end to generate an error voltage; a determination unit for monitoring a voltage output by the error amplifier, and for determining whether the bypass mode or the boost mode is currently set, and outputting a determination signal indicating obtained determination results; a first switch connected between output of the error amplifier and one end of the phase compensation impedance element; and a second switch connected between one end and the other end of the phase compensation impedance element, wherein when the determination signal indicates the bypass mode is currently set, the first switch is turned off and the second switch is turned on, or when the determination signal indicates the boost mode is currently set, the first switch is turned on and the second switch is turned off.

A DC-DC converter according to claim 12 of this invention, which sets, when an input voltage input at an input terminal is higher than a predetermined voltage, bypass mode for outputting the input voltage, unchanged, from an output terminal as an output voltage, or sets, when the input voltage is lower than the predetermined voltage, boost mode for increasing the input voltage and outputting the output voltage from the output terminal, is characterized by comprising: an error amplifier for outputting an error between the output voltage and the predetermined voltage; a phase compensation impedance element for performing phase compensation, and accumulating the error across one end to generate an error voltage; a determination unit for monitoring a voltage output by the error amplifier, and for determining whether the bypass mode or the boost mode is currently set, and outputting a determination signal indicating obtained determination results; a first switch connected between output of the error amplifier and one end of the phase compensation impedance element; a second switch connected between one end of the phase compensation impedance element and a node having a voltage higher than a voltage at the other end of the phase compensation impedance element, wherein when the determination signal indicates the bypass mode is currently set, the first switch is turned off and the second switch is turned on, or when the determination signal indicates the boost mode is currently set, the first switch is turned on and the second switch is turned off.

Advantageous Effects of Invention

According to the present invention, since in the bypass mode a voltage at one end of the phase compensation impedance element is set higher than the ground voltage, when the bypass mode is changed to the boost mode, a period required until the error voltage, at which the performance of the boosting operation is most discouraged, is set to zero can be reduced, and the switching operation can be immediately performed in consonance with a load current, so that there are effects that the undershoot that occurs due to switching from the bypass mode to the boost mode can be reduced.

DESCRIPTION OF EMBODIMENTS

Figure 1:
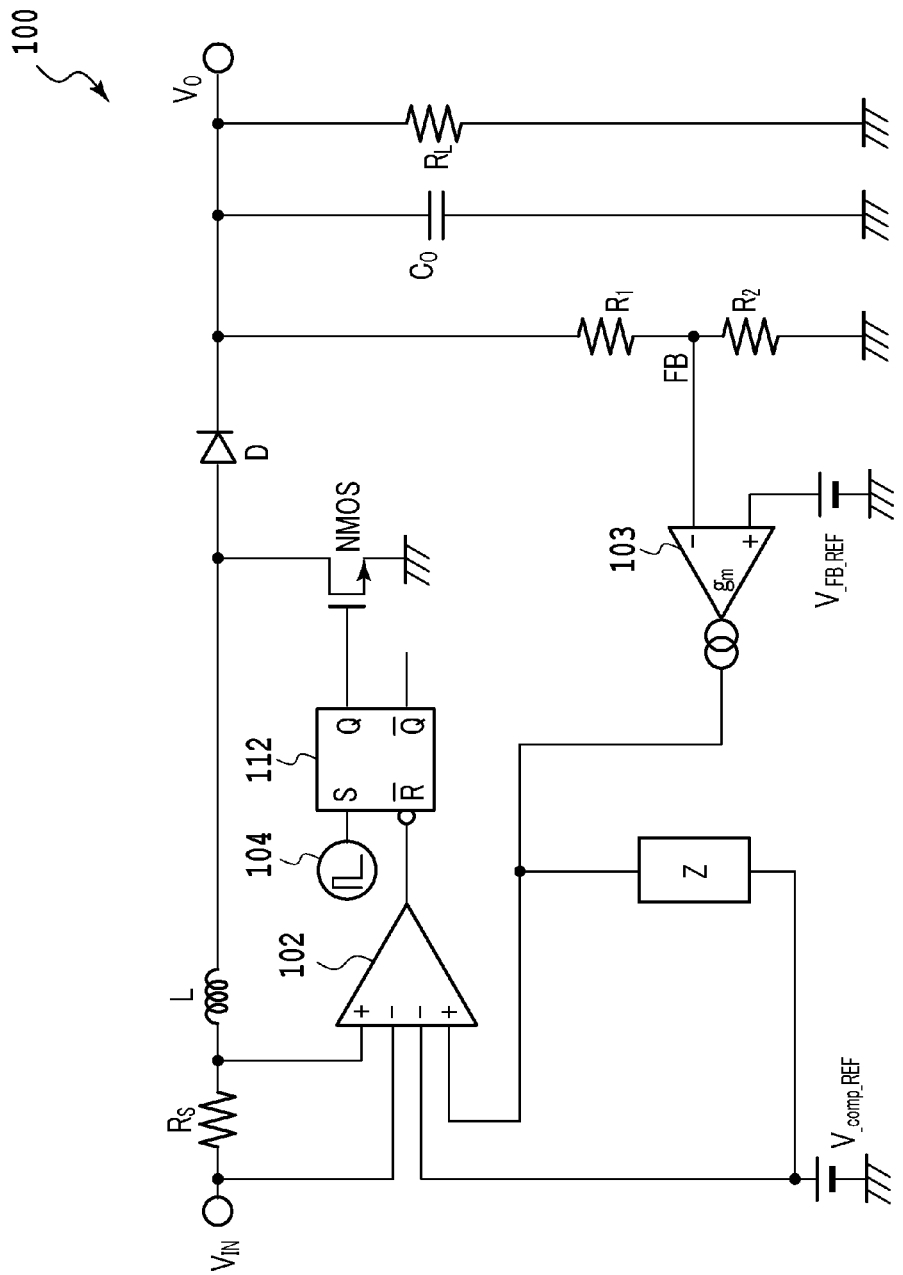
FIG. 1 A circuit diagram for a conventional DC-DC converter.

Embodiments for a DC-DC converter according to the present invention will now be described in detail while referring to the drawings.

Figure 2:
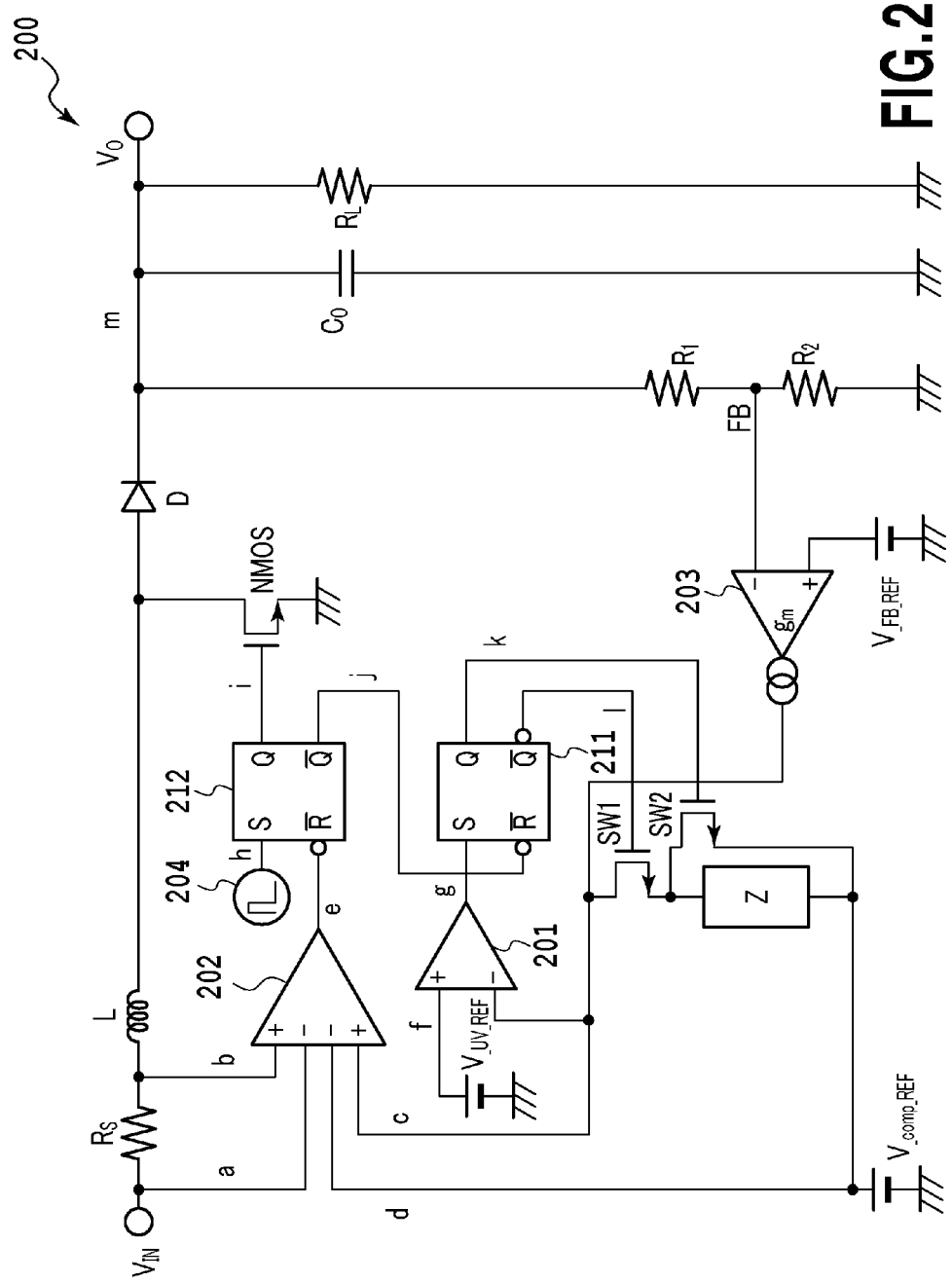
FIG. 2 A circuit diagram for a DC-DC converter according to a first embodiment of the present invention.

First, a first embodiment for the DC-DC converter of this invention will be described. FIG. 2 is a circuit diagram for a DC-DC converter for the first embodiment of the present invention.

A DC-DC converter 200 for this embodiment includes: an input-side sense resistor Rs; an inductor L connected to the Rs in series; a diode D, the anode of which is connected to the L; an N-channel MOS transistor NMOS that is connected between the anode of the D and the L and to ground; a resistive voltage divider that includes resistors R1 and R2 connected in series; an error amplifier 203 that generates an error between a common joint FB of the resistive voltage divider and $V\_{FB\_REF}$; a reference voltage source $V\_{comp\_REF}$; a comparator 202 that compares a voltage difference across the two ends of the Rs with a difference between the output of the error amplifier 203 and a reference voltage $V\_{comp\_REF}$; a pulse oscillator 204; and a latch circuit 212 that receives the output of the pulse oscillator 204 at a set terminal, and receives the output of the comparator 202 at a reset terminal, and that provides its output for the NMOS. With this arrangement, when an input voltage $V_{IN}$ input at the input terminal is higher than a predetermined voltage, bypass mode in which the input voltage $V_{IN}$ is output, unchanged, from the output terminal as an output voltage $V_O$ is set, and when the input voltage $V_{IN}$ is lower than the predetermined voltage, boost mode in which the input voltage $V_{IN}$ is increased, and the output voltage $V_O$ is output from the output terminal. Here, the predetermined voltage is a desired output voltage that is employed as a target in the boost mode.

The DC-DC converter 200 of this embodiment also includes: a phase compensation impedance element Z, connected between the output of the error amplifier 203 and the reference voltage source $V\_{comp\_REF}$; a switch SW1, connected between one end of the phase compensation impedance element Z and the error amplifier 203; a switch SW2, connected between both ends of the phase compensation impedance element Z; a comparator 201, which compares the output of the error amplifier 203 with a reference voltage $V\_{UV\_REF}$; and a latch circuit 211, which receives at a set terminal the output of the comparator 201 and receives at a reset terminal the output of the inverted output terminal of the latch circuit 212, and for which the non-inverted output terminal is connected to the control terminal of the SW2, and the inverted output terminal is connected to the control terminal of the SW1. It should be noted that, instead of connecting the inverted output terminal of the latch circuit 212 to the reset terminal of the latch circuit 211, the output of the comparator 201 may be connected to the reset terminal of the latch circuit 211.

The phase compensation impedance element Z performs phase compensation, and also accumulates an error between the output voltage $V_O$ and the predetermined voltage and generates an error voltage. Further, the comparator 201 serves as a determination unit, which monitors the output voltage of the error amplifier 203 to determine whether the current mode is either the bypass mode or the boost mode, and outputs a determination signal g indicating the determination result. That is, the determination unit determines whether the output voltage of the error amplifier 203 is higher, or lower than the reference voltage $V\_{UV\_REF}$ that corresponds to a predetermined voltage, and outputs the determination signal g indicating the determination result. The latch circuit 211 and the switches SW1 and SW2 constitute a voltage setting unit, which sets a voltage for one end of the phase compensation impedance element Z equal to, or higher than a voltage for the other end when the bypass mode is set, i.e., when the output voltage of the error amplifier 203 is lower than the reference voltage $V\__{UV\_REF}$ and the determination signal g indicates the bypass mode, or which cancels the setting when the boost mode is set, i.e., when the output voltage of the error amplifier 203 is higher than the reference voltage $V\__{UV\_REF}$ and the determination signal g indicates the boost mode.

Specifically, in the bypass mode, the voltage setting unit establishes a short circuit between the two ends of the phase compensation impedance element Z, and in the boost mode, cancels this short circuit. That is, the voltage at one end of the phase compensation impedance element Z is set equal to the voltage at the other end by establishing a short circuit. In the bypass mode, without requiring another voltage source, the voltage setting unit establishes a short circuits, and applies a voltage of zero to the phase compensation impedance element Z as an error voltage that is obtained when the output voltage $V_O$ is a predetermined voltage or lower.

The voltage setting unit includes the switch SW1, employed for disconnecting the phase compensation impedance element Z from the output of the error amplifier 203 and the input of the comparator 202; and the switch SW2, employed for establishing a short circuit between the two ends of the phase compensation impedance Z. Further, when the comparator 201 that serves as the determination unit compares the output voltage of the error amplifier 203 with the reference voltage $V\__{UV\_REF}$ that corresponds to the predetermined voltage, and finds that the output voltage of the error amplifier 203 is lower than the reference voltage $V\__{Uv\_REF}$ that corresponds to the predetermined voltage, the voltage setting unit turns off the SW1, or when the output voltage of the error amplifier 203 is higher than the $V\__{UV\_REF}$, the voltage setting unit turns on the SW2. The voltage setting unit also includes the latch circuit 211 that latches the output of the comparator 201 when the output of the error amplifier 203 has been increased, and the output of the comparator 202 has gone high, and that turns on the SW1 and turns off the SW2 at the time where the boost transistor NMOS is turned on.

The reference voltage $V\__{UV\_REF}$ is a reference voltage that indicates the boundary between the bypass mode and the boost mode, and is employed to detect that the output voltage is higher than the predetermined level, and that corresponds to the predetermined voltage. The reference voltage $V\__{UV\_REF}$ is a voltage slightly higher than the ground voltage, and falls outside a voltage range that is available for the output voltage of the error amplifier 203 in a load range applicable for a load $R_L$ in the boost mode, covering from the highest load condition to the lowest load condition. That is, in the boost mode, when the load is reduced and the output voltage $V_O$ begins to increase, for example, the error amplifier 203 absorbs charges from the phase compensation impedance element Z, and the error voltage is lowered. The level of the reference voltage $V\__{UV\_REF}$ is lower than the error voltage at this time, and does not interrupt the boosting operation. As a result, switching control can be performed, so that the output voltage $V_O$ can reach a predetermined target voltage. The reference voltage $V\__{UV\_REF}$ can be set to a voltage level at which the boosting operation is not hindered because, since an error obtained by the error amplifier 203 is integrated, i.e., since the phase compensation impedance element Z performs integration and generates an error voltage, when the condition where the input voltage $V_{IN}$ is higher, even slightly, than the predetermined voltage continues, the error voltage becomes lower than the reference voltage $V\__{UV\_REF}$ in due time.

Here, the comparator 202 is a 4-input comparator (a differential amplifier), which compares a potential difference across the two ends of the input-side sense resistor Rs with a potential difference between the output of the error amplifier 203 and $V\__{comp\_REF}$. A transfer function for the comparator 202 is e=sgn{(b–a)–(d–c)}=sgn(b–a–d+c), and when the sum of the voltage values at the individual inverted input terminals ("–" input terminals) is subtracted from the sum of the voltage values at the individual non-inverted input terminals ("+" input terminals), and when the result is positive, "active-high" is output, while when the result is negative, "active-low" is output. It should be noted that the voltage values at the individual nodes are represented by a, b, c, d and e, respectively.

The error amplifier 203 is provided as a transconductance amplifier (gm cell), which outputs a current obtained by amplifying a differential voltage across the positive input terminal and the negative input terminal.

Further, the latch circuit 211 is a set dominant latch circuit, which is reset when the NMOS is turned on. In this embodiment, a PWM signal j that is the inversion signal of a PWM signal i, which the latch circuit 212 outputs to the NMOS, is employed as a reset signal without being changed. Therefore, in this embodiment, preparation of a signal for resetting the latch circuit 211 is not especially required.

Figure 3:
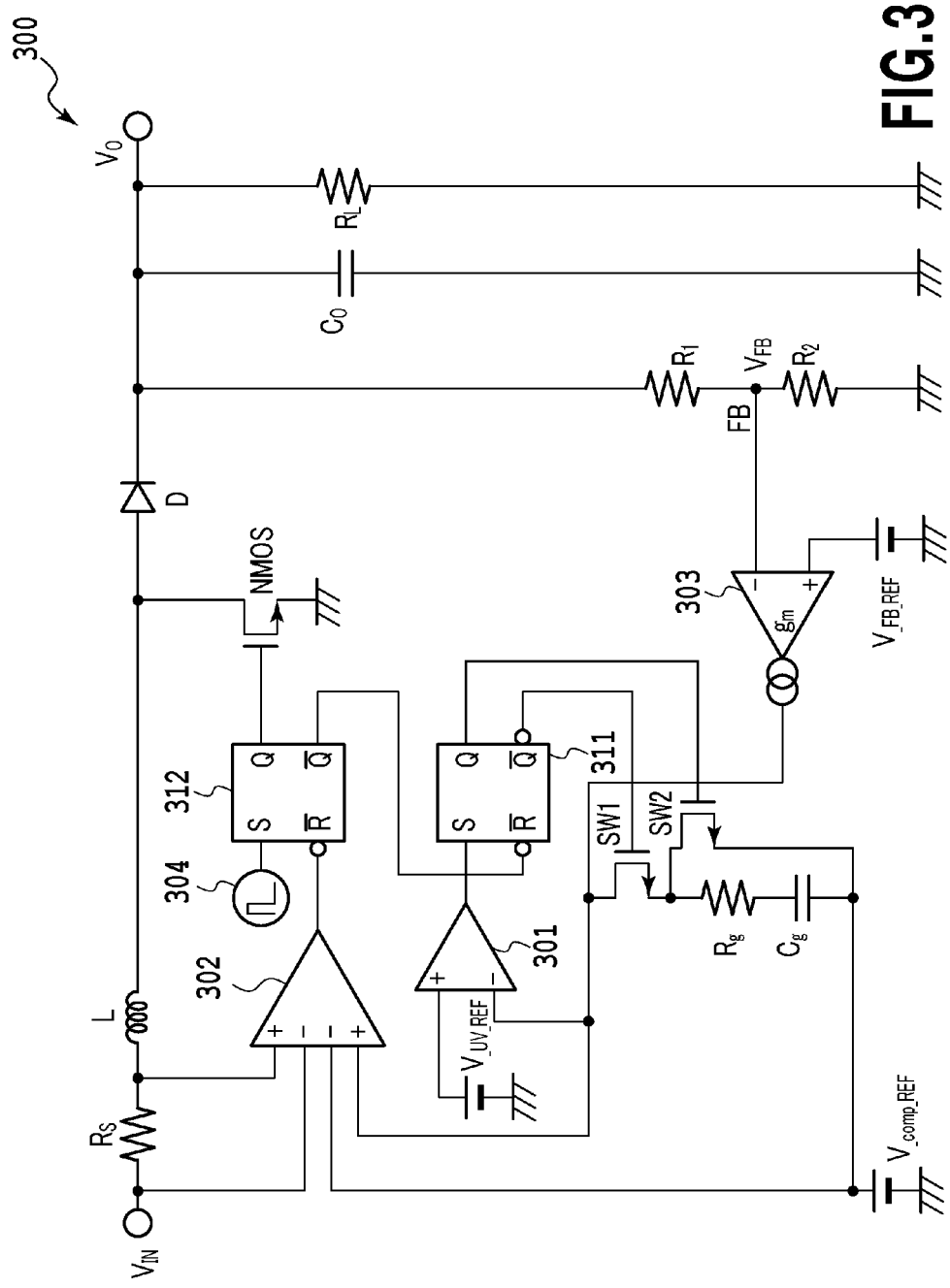
FIG. 3 A circuit diagram for the DC-DC converter for the first embodiment, for which a phase compensation impedance element is embodied.

FIG. 3 is a circuit diagram for a DC-DC converter 300 for this embodiment that embodies a phase compensation impedance element Z.

The phase compensation impedance element Z includes a resistor Rg and a capacitor Cg connected in series. The phase compensation impedance element Z integrates a current obtained by amplifying a difference between $V_{FB}$ and $V\__{FB\_REF}$, output by the error amplifier 303, and generates an error voltage. The phase compensation impedance element Z of a DC-DC converter, explained hereinafter for all of the embodiments, can be provided by employing the above described arrangement.

Figure 4:
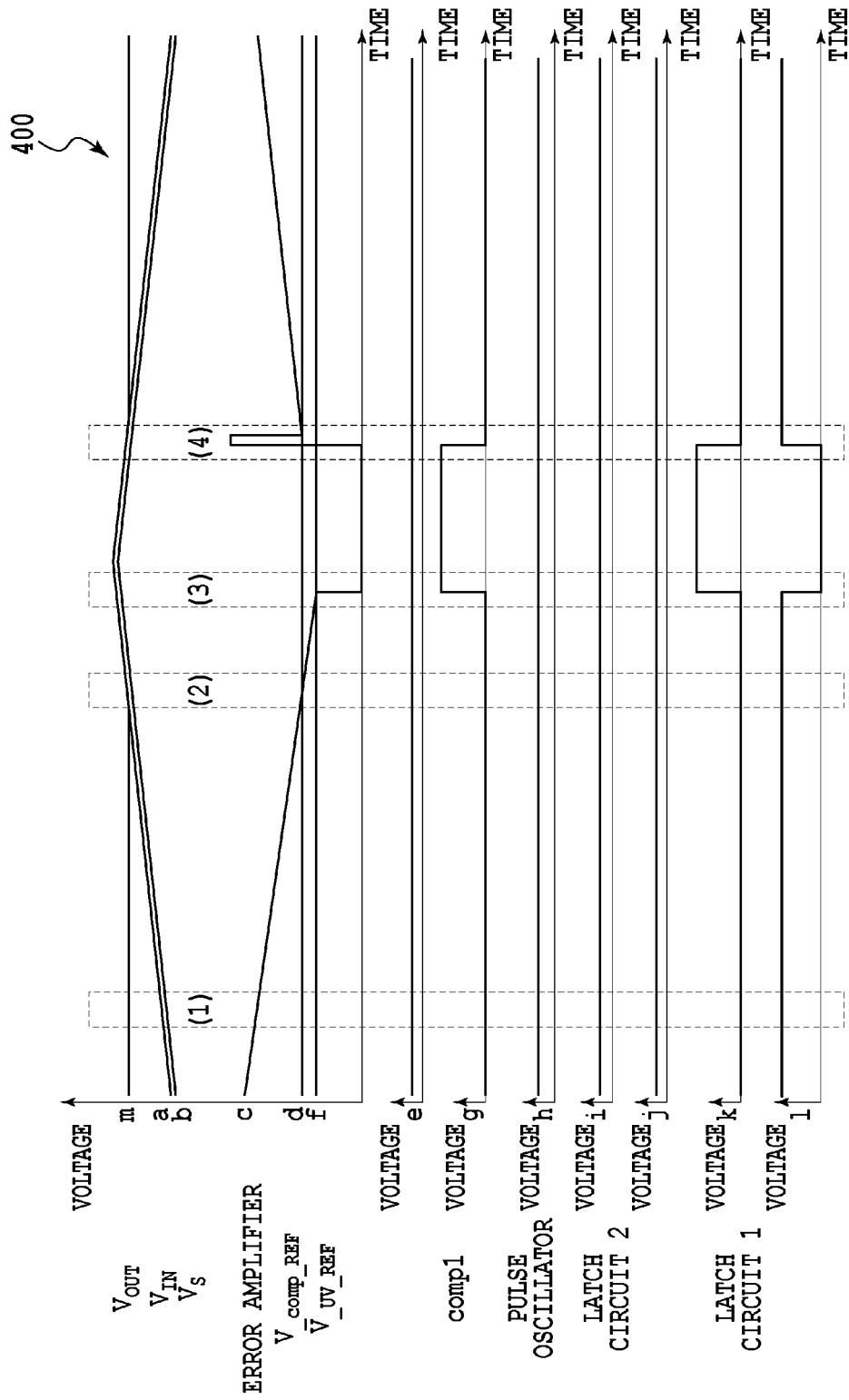
FIG. 4 A timing chart for explaining the operation of the DC-DC converter for the first embodiment of the present invention.

FIG. 4 is a timing chart for explaining the operation of the first embodiment.

The timing chart represents a case wherein the input voltage changes from a voltage below a predesignated output voltage to above the output voltage, and thereafter changes again to a lower level. Since the period for the switching operation is very short along the time axis of the timing chart in FIG. 4, the average period for the switching operation is shown in FIG. 4, and the detailed switching operation is illustrated by employing the enlarged diagrams in FIGS. 5 to 8. The individual waveforms a, b, c, d, f and m are analog waveforms, and continuous values are provided. The waveform b is a triangular wave in a region smaller than m; however, since the wave period is very short relative to the time axis, the average waveform is represented by employing a linear line. The individual waveforms e, g, h, i, j, k and 1 are digital waveforms (logic waveforms), and discrete values are provided. Since very frequently two values of H and L are alternately employed for the waveforms e, h, i and j, these waveforms are represented by using the average of voltages H and L, i.e., an intermediate voltage of H and L.

Figure 5:
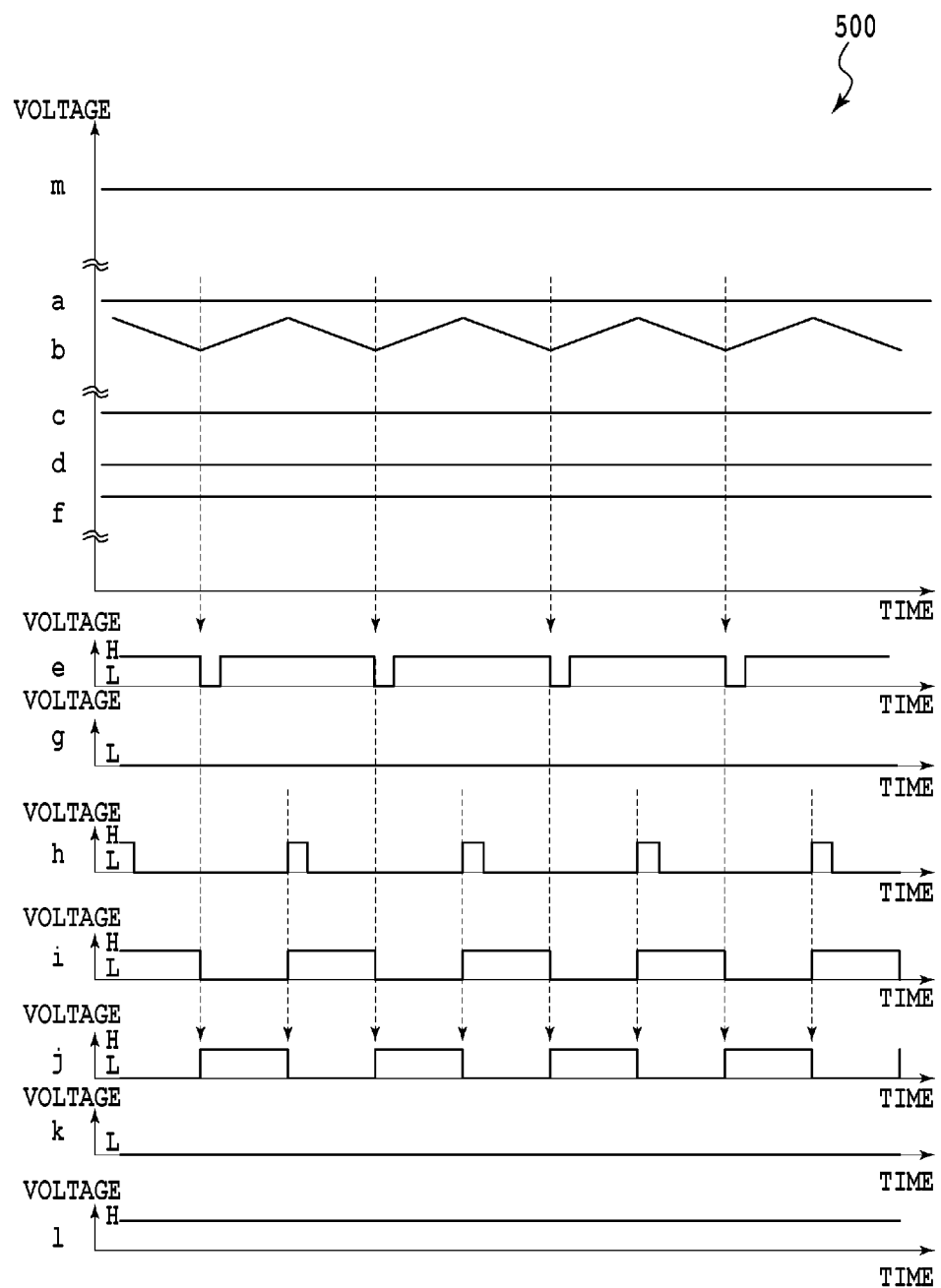
FIG. 5 An enlarged timing chart for one part of FIG. 4.

FIG. 5 is an enlarged timing chart for (1), which is one part of FIG. 4.

Referring to (1) in FIG. 4, since the input voltage $V_{IN}$ is lower than the setup value for the output voltage $V_O$, the boost mode is set, and the normal boosting operation is performed. In (1) in FIG. 4, a and b are gradually increased, and since (1) is enlarged along the time axis in FIG. 5, a and b have only a small change along the vertical axis, and are depicted horizontally. The waveform for a is flat and the waveform for b is triangular. First, since the waveform f of the reference voltage $V\__{UV\_REF}$ is located lower than the waveform c, the output g of the comparator 201 goes low, and the latch circuit 211 is not set. Further, since the PWM signal j that is the inversion of the i is transmitted to the reset terminal of the latch circuit 211, the latch circuit 211 is reset with the j in the active-low state, and an active-low signal is output from the non-inverted output terminal, while an active-high signal is output form the inverted output terminal. Sequentially, the switch SW1 is turned on, while the switch SW2 is turned off to establish a connection of the phase compensation impedance element Z to the output terminal of the error amplifier 203. Thereafter, an error voltage is accumulated in the phase compensation impedance Z. Since the g is in the active-low state, the k and l are fixed values.

Since in the boost mode, the NMOS performs the switching operation, and a current with a triangular wave (a ramp wave) flows across the inductor L, the current with a triangular wave also flows across the sense resistor Rs, and the triangular voltage wave is obtained for the node b (since the voltage is averaged in FIG. 4, a smooth waveform is shown). As a result, a difference between a and b is represented as a triangular wave. The voltage at the node c is an error voltage that corresponds to an error between the output voltage $V_O$ and a desired output voltage, and the voltage at the node d is the reference voltage $V\_{comp\_REF}$. The comparator 202 compares the triangular wave voltage with the error voltage, and outputs a signal e having a duty cycle, the OFF period of which corresponds to the error voltage. The signal e is transmitted to the reset terminal of the latch circuit 212. The latch circuit 212 is set in the active-high period of the pulse oscillator, or is reset in the active-low period of the signal e, and a PWM signal having a duty cycle consonant with the error voltage is output from the non-inverted output terminal (terminal Q) to the NMOS. Thereafter, when the NMOS is turned on, the inductor L charges a charge current, and when the NMOS is turned off, discharges the charge current to an output capacitor $C_O$ through the diode D. In this manner, the waveform m of the output voltage $V_O$ is increased to obtain a predetermined, stable voltage.

Figure 6:
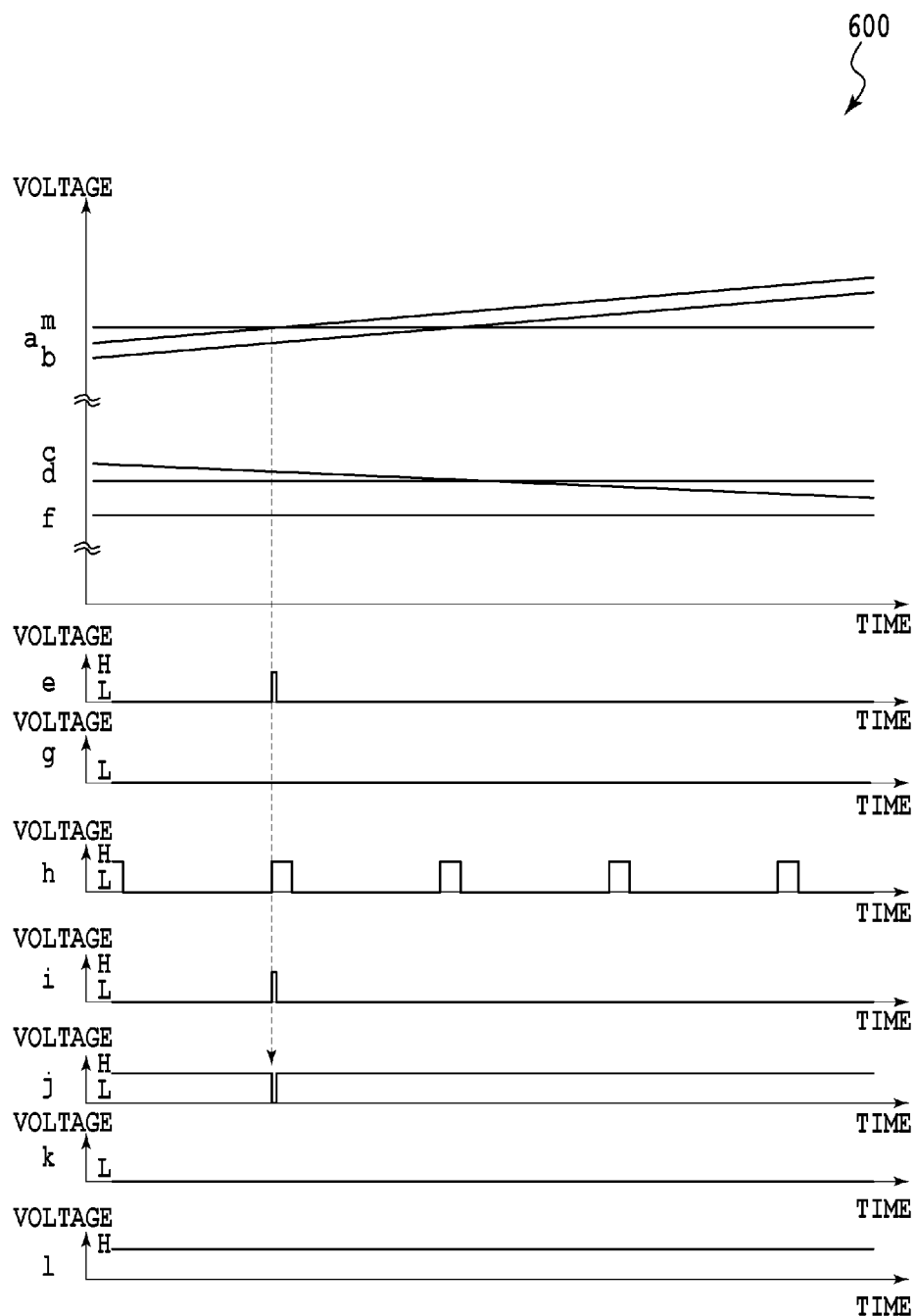
FIG. 6 An enlarged timing chart for one part of FIG. 4.

FIG. 6 is an enlarged timing chart for (2) that is one part of FIG. 4.

(2) in FIG. 4 shows a case wherein the input voltage $V_{IN}$ is raised beyond the setup value for the output voltage $V_O$.

In a case wherein the input voltage $V_{IN}$ is below the setup value of the output voltage $V_O$, the boosting operation is performed, and when the input voltage $V_{IN}$ goes beyond the setup level for the output voltage $V_O$, the output voltage $V_O$ rises together with the input voltage $V_{IN}$. For the sake of convenience, suppose that the diode here is the ideal diode, and the forward voltage is 0 V.

Referring to FIG. 6, an input voltage a is increased and a coil current flows, while a voltage b is dropped below the input voltage $V_{IN}$.

In a case wherein the voltage b is lower than the setup value for the output voltage $V_O$, a gate signal i of the NMOS goes high and the boosting operation is performed to prevent a drop of the output voltage below a desired output voltage level. When the voltage b is raised higher than the desired output voltage, the voltage FB is increased, and the error amplifier 203 absorbs a current. Thereafter, the voltage c is reduced, the comparator 202 maintains in the active LOW state, the latch circuit 212 is always reset, and the NMOS is not turned ON. Furthermore, the voltage b is raised above the output voltage, a current flows across the above described diode D, and the output voltage is increased beyond the predetermined voltage value. That is, the operation in the bypass mode is performed. Then, a linear waveform is obtained for the b.

Figure 7:
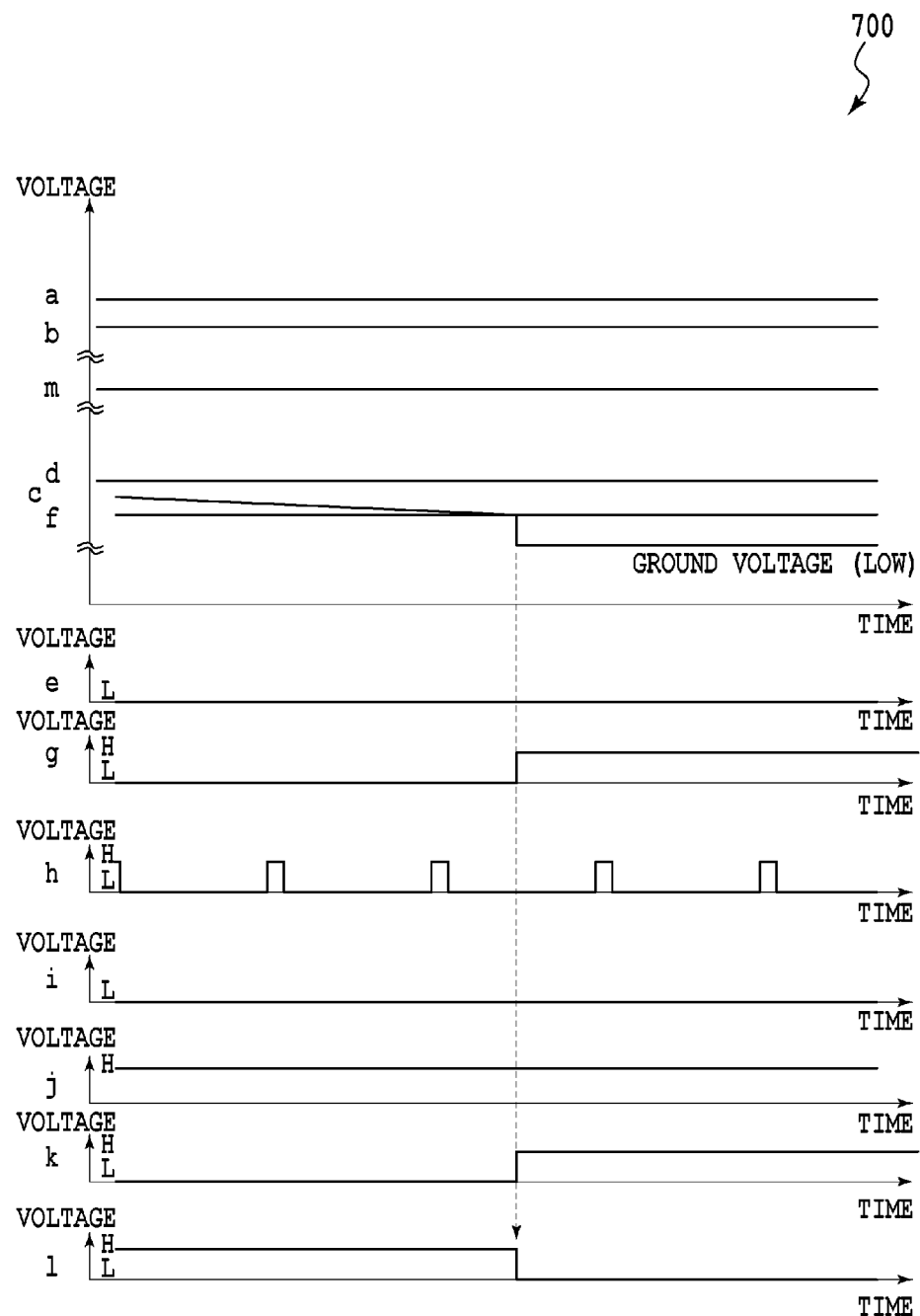
FIG. 7 An enlarged timing chart for one part of FIG. 4.

FIG. 7 is an enlarged timing chart for (3) that is one part in FIG. 4.

In the state wherein the output voltage is higher than a predetermined value, the error amplifier 203 continues absorption of the current. Since the phase compensation impedance Z includes an integral element because of the capacitor Cg (a general DC-DC converter also includes an integral element), when the state wherein the output voltage is above the setup value continues, the output voltage c of the error amplifier 203 is reduced and reaches below the waveform f of the predetermined voltage $V\_{UV\_REF}$. The comparator 201 provides active-high output, and the latch circuit 211 is set. Thereafter, k goes high, while l goes low, and the phase compensation impedance element Z is disconnected from the error amplifier 203 and is short-circuited, so that the voltage across the two ends of the Z becomes zero. Furthermore, the c stays at the ground voltage, and a difference between the c and d becomes a negative voltage.

As a result, in the bypass mode, the voltage at one end of the phase compensation impedance element Z can be set at the same voltage level as the other end, i.e., a voltage of zero can be set.

Figure 8:
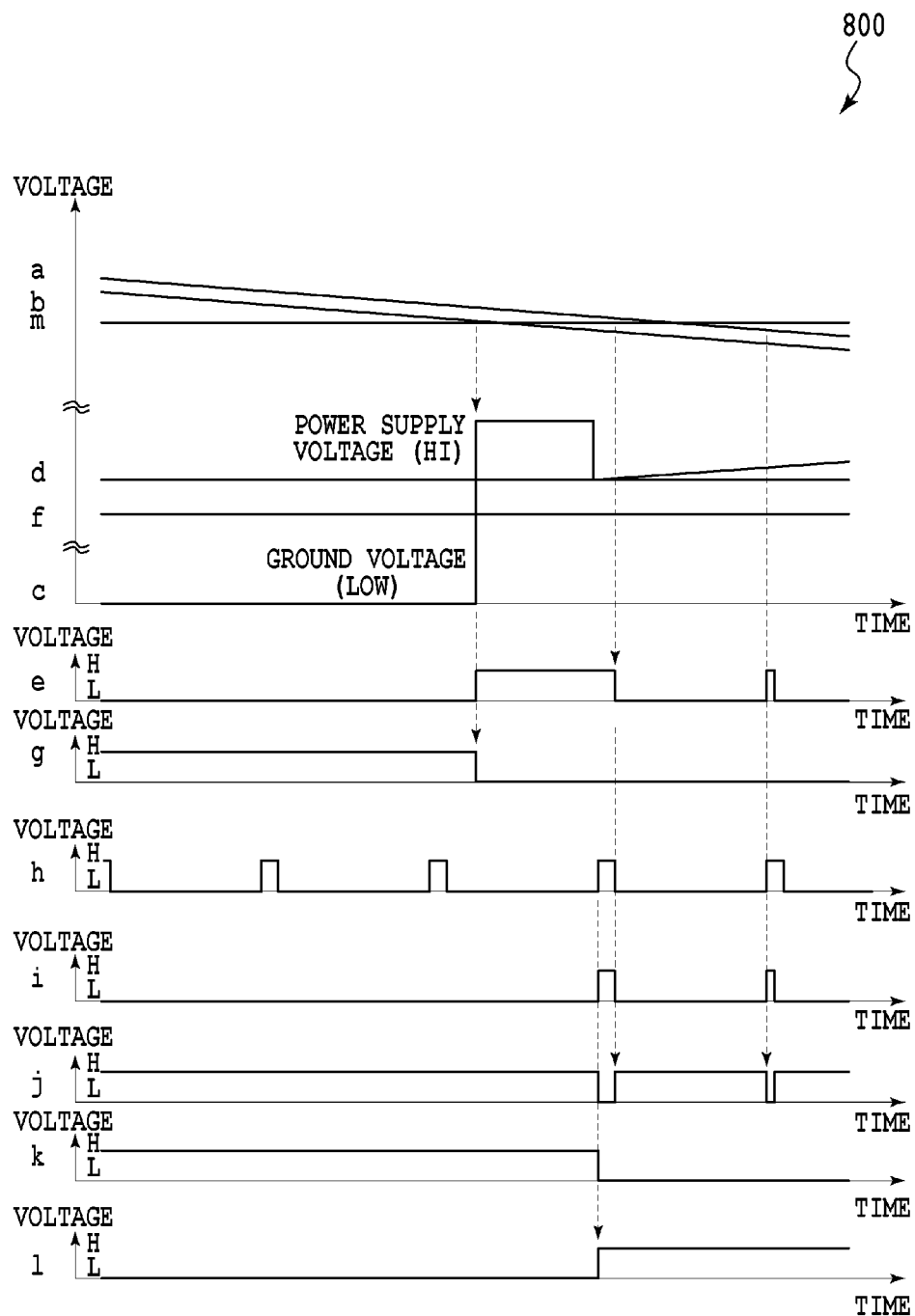
FIG. 8 An enlarged timing chart for one part of FIG. 4.

FIG. 8 is an enlarged timing chart for (4) that is one part in FIG. 4.

Referring to FIG. 8, when the input voltage a is reduced and the voltage b becomes below a predetermined voltage value for the output voltage, the voltage FB is lower than the $V\_{FB\_REF}$, and the output of the error amplifier 203 goes High. Then, a voltage difference (d−c) between c and d becomes greater than a voltage difference (b−a) between a and b, and the output e of the comparator 202 goes High. As a result, the boost NMOS is turned on at the timing of a clock h output by the pulse oscillator 204. Further, at the same timing, the latch circuit 211 is reset by the j, and the SW1 is turned on, while the SW2 is turned off, so that the operation is returned to the PWM operation. That is, the bypass mode is changed to the boost mode. Further, since a voltage of zero caused by a short circuit has been set for the phase compensation impedance element Z until immediately before the modes were switched, as soon as the modes are switched, the voltage of Z is directly employed as the voltage for the node c. That is, a period required until the error voltage, at which the performance of the boosting operation is most discouraged, is set to zero can be eliminated, and the switching operation can be immediately performed in consonance with a load current.

Figure 9:
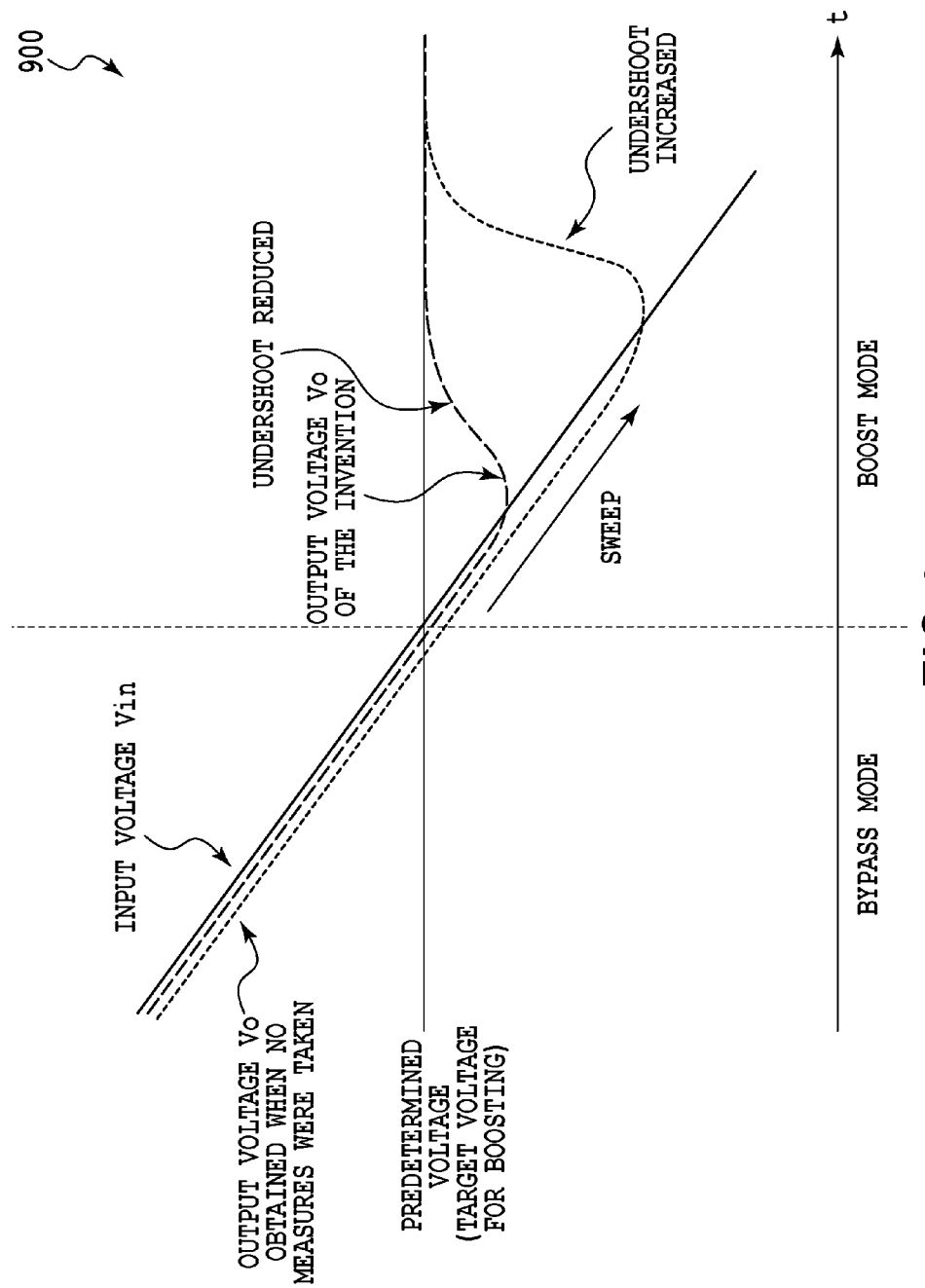
FIG. 9 A waveform chart for explaining the operation of the DC-DC converter for the first embodiment of the present invention.

FIG. 9 is a waveform chart for the output voltage $V_O$ of the DC-DC converter for the first embodiment of the present invention, provided for the detailed description of the operation performed when the input voltage $V_{IN}$ is swept to a voltage level below a predetermined voltage.

The horizontal axis represents time t, and the individual waveforms represent voltages. When the input voltage $V_{IN}$ (solid line) is swept from a voltage (bypass mode), which is higher than a predetermined voltage (a target voltage at the time of boosting), to a voltage (boost mode) that is lower than the predetermined voltage, i.e., when the input voltage is gradually reduced, the output voltage $V_O$ (dotted line) obtained in a case where no particular measured have been taken indicates that a longer period is required until an error voltage, at which the switching operation can be performed in consonance with a load current, is set for the phase compensation impedance element Z, and that the undershoot is increased.

Since the DC-DC converter for the first embodiment of this invention employs the arrangement that performs a series of operations for monitoring the output of the error amplifier, and setting a voltage, or canceling the setting, for the phase compensation impedance element Z, when the output voltage $V_O$ (broken line) becomes even slightly below the predetermined voltage, the output of the error amplifier is immediately inverted. As a result, for this invention, it can be immediately ascertained that the current mode is the boost mode, and the voltage setting for the phase compensation impedance element Z can be canceled. That is, a period required until an error voltage, at which the switching operation can be performed in accordance with a load current, is set for the phase compensation impedance element Z can be reduced.

With the above described arrangement and operation for the DC-DC converter 200 of this embodiment, since in the bypass mode, the voltage for one end of the phase compensation impedance element is set to the same level as for the voltage at the other end, when the bypass mode is changed to the boost mode, a period required until the error voltage, at which the performance of the boosting operation is most discouraged, is set to zero can be eliminated, and the switching operation can be performed immediately in consonance with a load current, so that there are effects that the undershoot that occurs due to switching from the bypass mode to the boost mode can be reduced.

In this embodiment, the voltage for one end of the phase compensation impedance element is set at the same voltage level as for the other end; however, so long as a voltage for one end is set at least higher than the lower output voltage limit (the ground voltage in this embodiment) of the error amplifier, i.e., is set higher than the lower voltage limit at which the error amplifier can provide output, a period required until an error voltage, at which the performance of the boosting operation is most discouraged, is set to zero can be shortened, and immediately the switching operation consonant with the load current can be performed, so that the undershoot that occurs due to switching from the bypass mode to the boost mode can be reduced.

Furthermore, in this embodiment, since establishing of a short circuit is employed to set a voltage for one end of the phase compensation impedance element to the same level as the voltage for the other end, the circuit structure is extremely simple.

Here, the magnitude of the undershoot that occurs due to switching from the bypass mode to the boost mode depends on the value of an error voltage, which is set for the Z in the bypass mode, and the level of a load $R_L$, and when the level of the load $R_L$ indicates the Typical value, or a value smaller than the Typical value, an error voltage is already set to a value at which a desired output voltage can be output, and therefore, undershoot does not occur.

Figure 10:
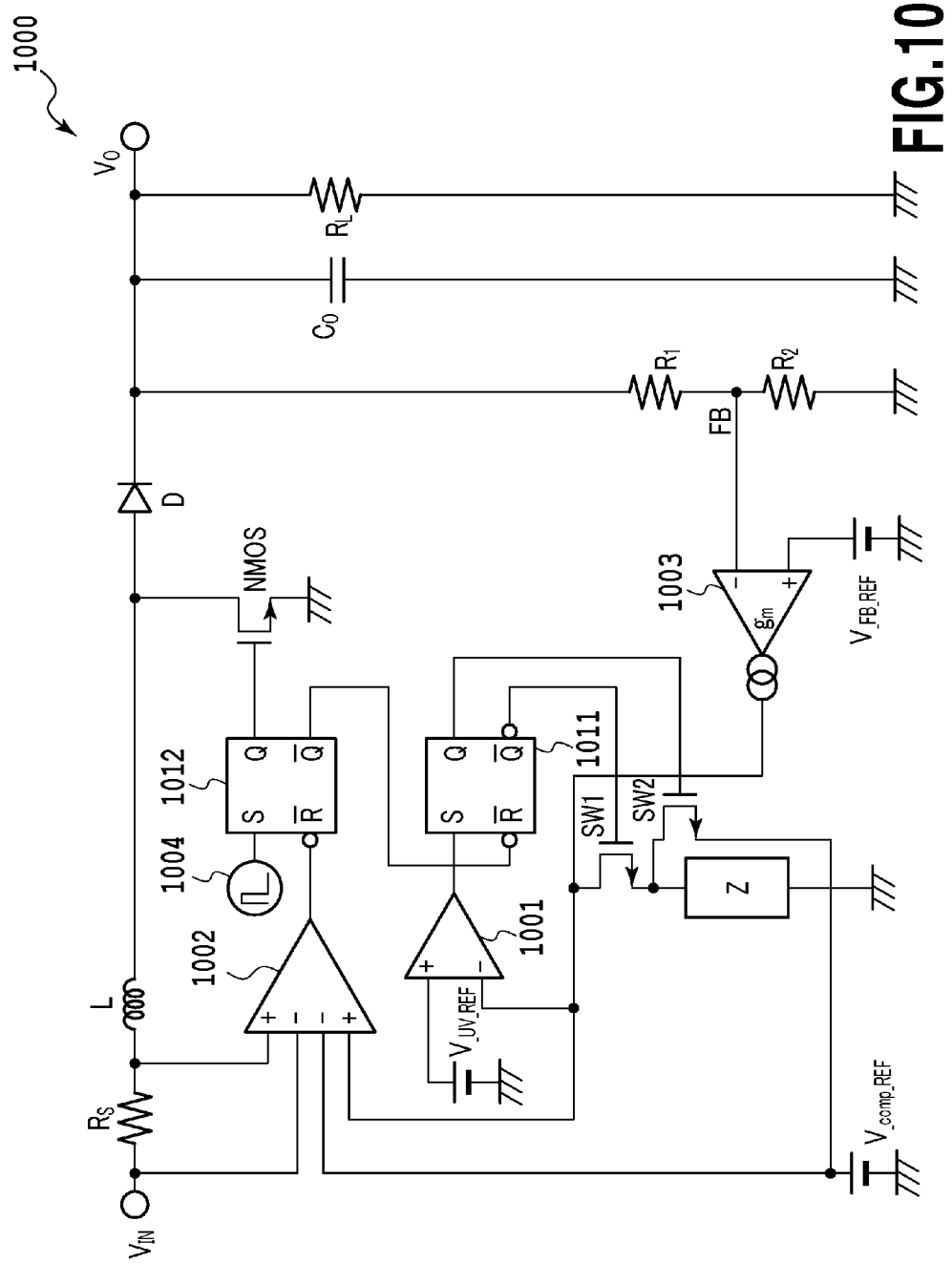
FIG. 10 A circuit diagram for a modification for the DC-DC converter of the first embodiment of the present invention.

It should be noted that in this embodiment, the switch SW2 is employed to establish a short circuit between both ends of the phase compensation impedance element Z; however, an arrangement shown in FIG. 10 may also be employed.

An example shown in FIG. 10 is a modification for the first embodiment, wherein one end of a phase compensation impedance element Z is connected to the drain of a switch SW2, and the other end is grounded. The source of the switch SW2 is connected to $V\_{comp\_REF}$. That is, the switch SW2 is connected between one end of the phase compensation impedance element Z and the node that has a voltage higher than the voltage for the other end of the phase compensation impedance element Z. In this modification, in bypass mode, a SW1 is turned off, while the SW2 is turned on, and a voltage at one end of the Z is set to the level of $V\_{comp\_REF}$, while the voltage at the other end is set to a ground voltage level, and in boost mode, the SW1 is turned on while the SW2 is turned off, and a connection of the output terminal of an error amplifier 1003 to one end of the Z is established. That is, in the bypass mode, the voltage at one end of the Z is set higher than the voltage at the other end. In this modification as well as in the first embodiment, immediately after the bypass mode is changed to the boost mode, the voltage at a node c is set to $V\_{comp\_REF}$. Therefore, a period required until an error voltage, at which the performance of the boosting operation is most discouraged, is set to zero can be eliminated, and the switching operation can be immediately performed in consonance with a load current, so that the undershoot that occurs due to the switching from the bypass mode to the boost mode can be reduced.

In this modification, a voltage at one end of the phase compensation impedance element Z may also be set at least higher than the lower output voltage limit (the ground voltage in this example) of the error amplifier, and since a period required until the error voltage, at which the performance of the boosting operation is most discouraged, is set to zero can also be shortened, and the switching operation can be immediately performed in consonance with a load current, the undershoot that occurs by changing the bypass mode to the boost mode can be reduced.

Figure 11:
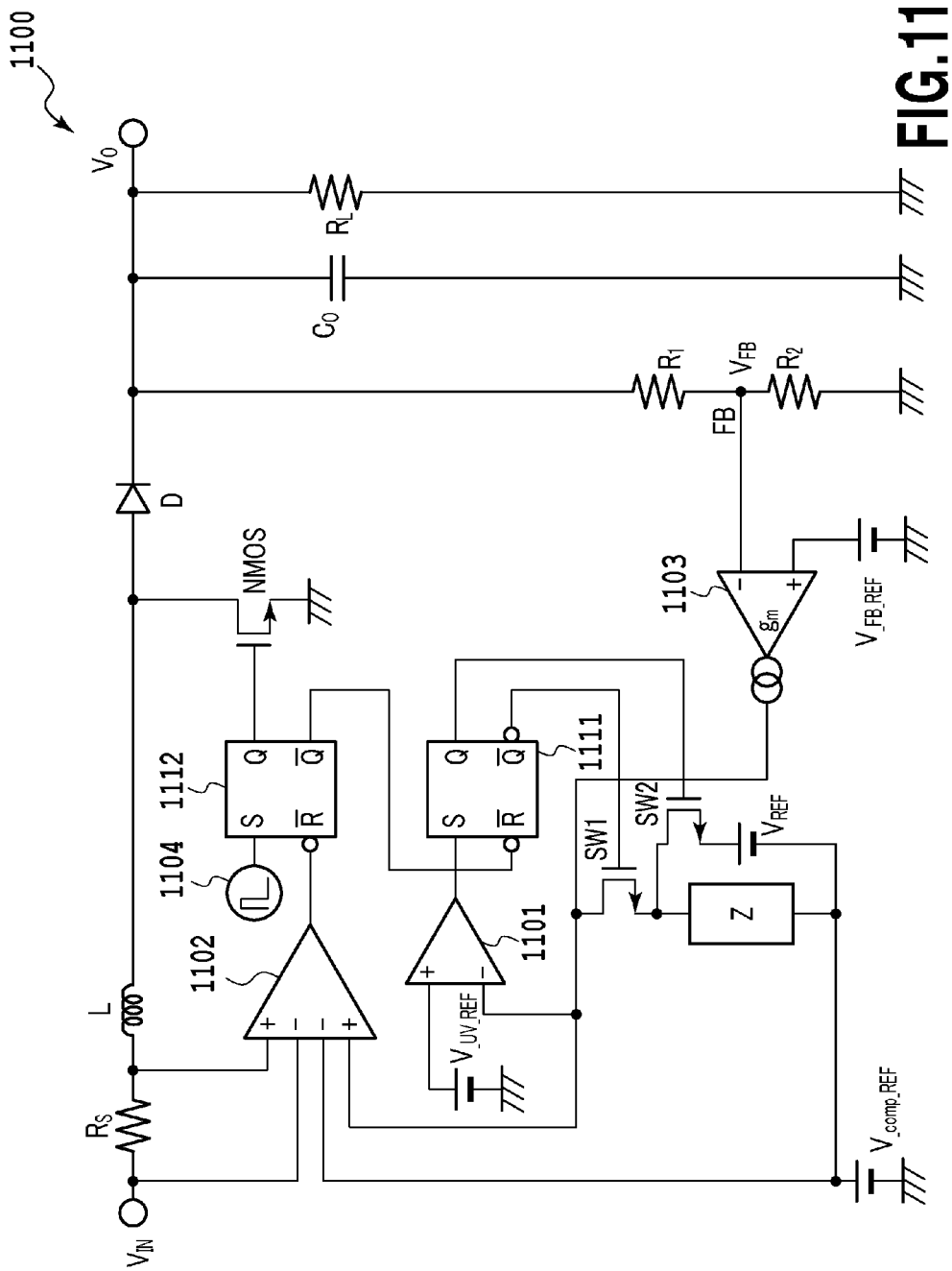
FIG. 11 A circuit diagram for a DC-DC converter according to a second embodiment of the present invention.

FIG. 11 is a circuit diagram for a DC-DC converter 1100 for a second embodiment of the present invention.

Compared with the DC-DC converter 200 of the first embodiment, the voltage setting unit of the DC-DC converter 1100 for this embodiment sets, in the bypass mode, a voltage for one end of a phase compensation impedance element Z to a level higher than a voltage for the other end.

Further, in the bypass mode, the voltage setting unit sets $V\_{comp\_REF}$ for the other end of the phase compensation impedance element Z, and sets $V_{REF}+V\_{comp\_REF}$, which is higher than $V\_{comp\_REF}$, for the one end, while in the boost mode, canceling this setting. In other words, in the bypass mode, $V\_{comp\_REF}$ is set for the other end of the phase compensation impedance element Z, and $V_{REF}$ is provided for both ends.

A specific structural difference from the first embodiment is that a reference voltage source for generating $V_{REF}$ is inserted between the source of a SW2 and the other end of the phase compensation impedance element Z. That is, in this embodiment, the switch SW2 is also connected between one end of the phase compensation impedance element Z and a node that has a voltage higher than a voltage for the other end of the phase compensation impedance element Z.

The operation of the DC-DC converter 1100 of this embodiment is performed basically in the same manner as the operation of the DC-DC converter for the first embodiment.

A difference from the operation of the first embodiment is that, in the bypass mode, an error voltage obtained when an output voltage Vo is lower than a predetermined target voltage for the boost mode, i.e., an error voltage that encourages the performance of the boosting operation, is set for the phase compensation impedance element Z. For the DC-DC converter 1100 of this embodiment, when the bypass mode is changed to the boost mode, the error voltage at which the boosting operation is encouraged is immediately affected to a comparator 1102, which then outputs, to the reset terminal of a latch circuit 1112, a reset signal having a shorter active-low period than that for the first embodiment.

Therefore, the duty of a PWM signal output at a terminal Q of the latch circuit 1112 is higher than the duty of the PWM signal for the first embodiment. Thus, after the bypass mode has been changed to the boost mode, the boosting operation is performed for a specific period of time in order to increase the output voltage $V_O$ above a desired output voltage, and therefore, the undershoot that occurs due to switching from the bypass mode to the boost mode can be further reduced.

With the above described structure and the operation for the DC-DC converter 1100 of this embodiment, in the bypass mode, a voltage for one end for the phase compensation impedance element is set higher than a voltage for the other end, and therefore, when the bypass mode is changed to the boost mode, the boosting operation can be performed to increase the output voltage above the predetermined voltage, so that there are effects that the undershoot that occurs due to changing of the bypass mode to the boost mode can be further reduced.

In this embodiment, a voltage for one end of the phase compensation impedance element Z may be also set at least higher than the lower output voltage limit (the ground voltage in this embodiment) of the error amplifier, and a period required until the error voltage, at which the boosting operation is most discouraged, is set to zero can be reduced, and the switching operation can be immediately performed in consonance with a load current, so that the undershoot that occurs when the bypass mode is changed to the boost mode can be reduced.

Figure 12:
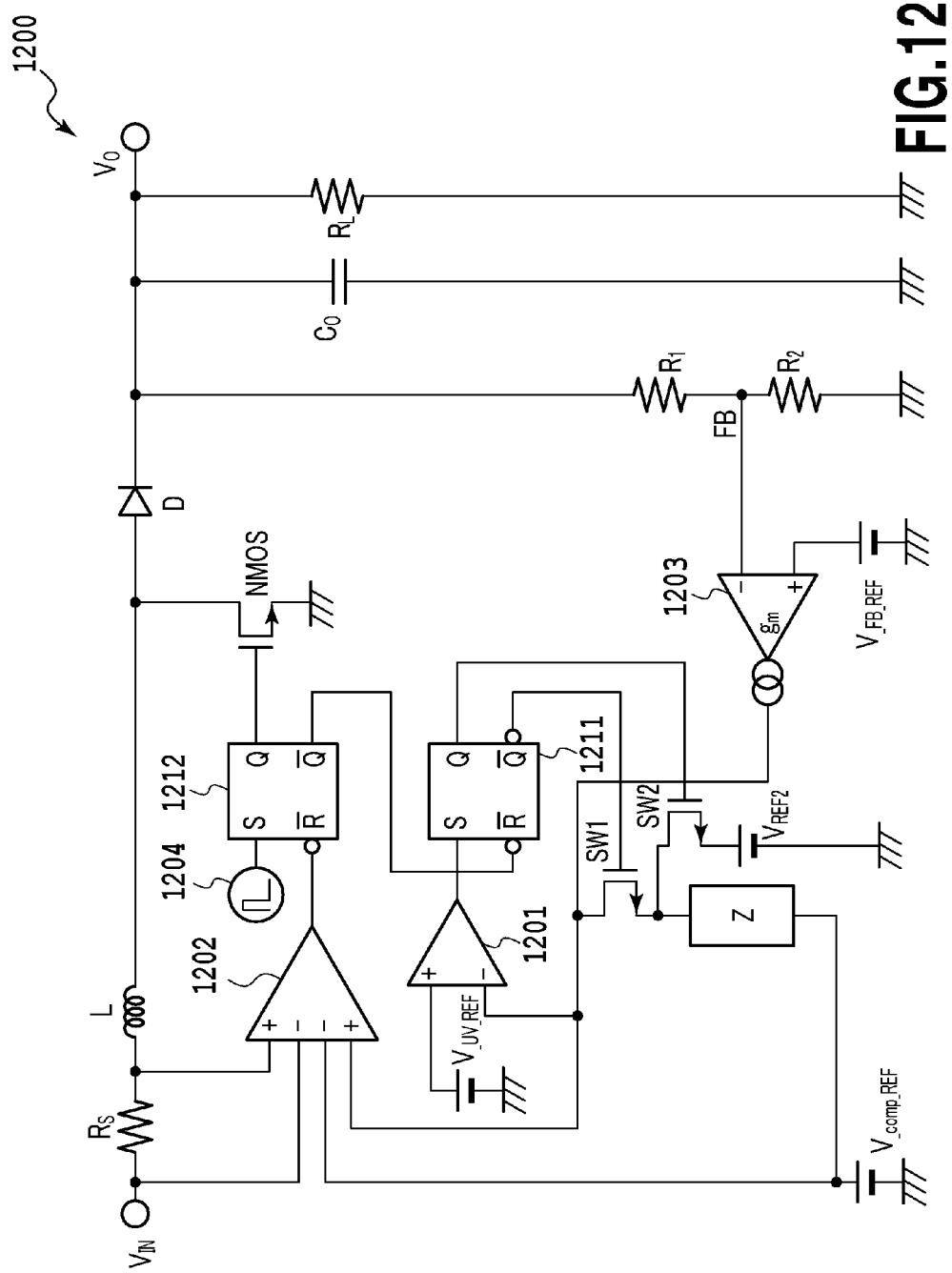
FIG. 12 A circuit diagram for a modification for the DC-DC converter of the second embodiment of the present invention.

In this embodiment, $V_{REF}$ is connected between the other end of the Z and $V\_comp\_REF$; however, the arrangement shown in FIG. 12 may also be employed.

FIG. 12 is a circuit diagram for a modification 1200 for the DC-DC converter of the second embodiment of the present invention.

In this modification, a reference voltage $V_{REF2}$ is arranged between the source of a switch SW2 and ground. That is, also in this example, the switch SW2 is connected between one end of the phase compensation impedance element Z and a node that has a voltage higher than a voltage for the other end of the phase compensation impedance element Z. $V_{REF2}$ is the same voltage level as $V_{REF}+V\_comp\_REF$. In the bypass mode, voltages set across the two ends of the Z are the same as those for the second embodiment. In other words, in the bypass mode, the voltage at one end of the Z is set higher than the voltage at the other end.

Therefore, when the mode is changed to the boost mode, the boosting operation can be performed to increase the output voltage above the predetermined voltage, and therefore, there are effects that the undershoot that is caused by changing the bypass mode to the boost mode can be further reduced.

In this modification, a voltage for one end of the phase compensation impedance element Z may be also set at least higher than the lower output voltage limit (the ground voltage in this embodiment) of the error amplifier, and a period required until the error voltage, at which the boosting operation is most discouraged, is set to zero can be reduced, and the switching operation can be immediately performed in consonance with a load current, so that the undershoot that occurs when the bypass mode is changed to the boost mode can be reduced.

Figure 13:
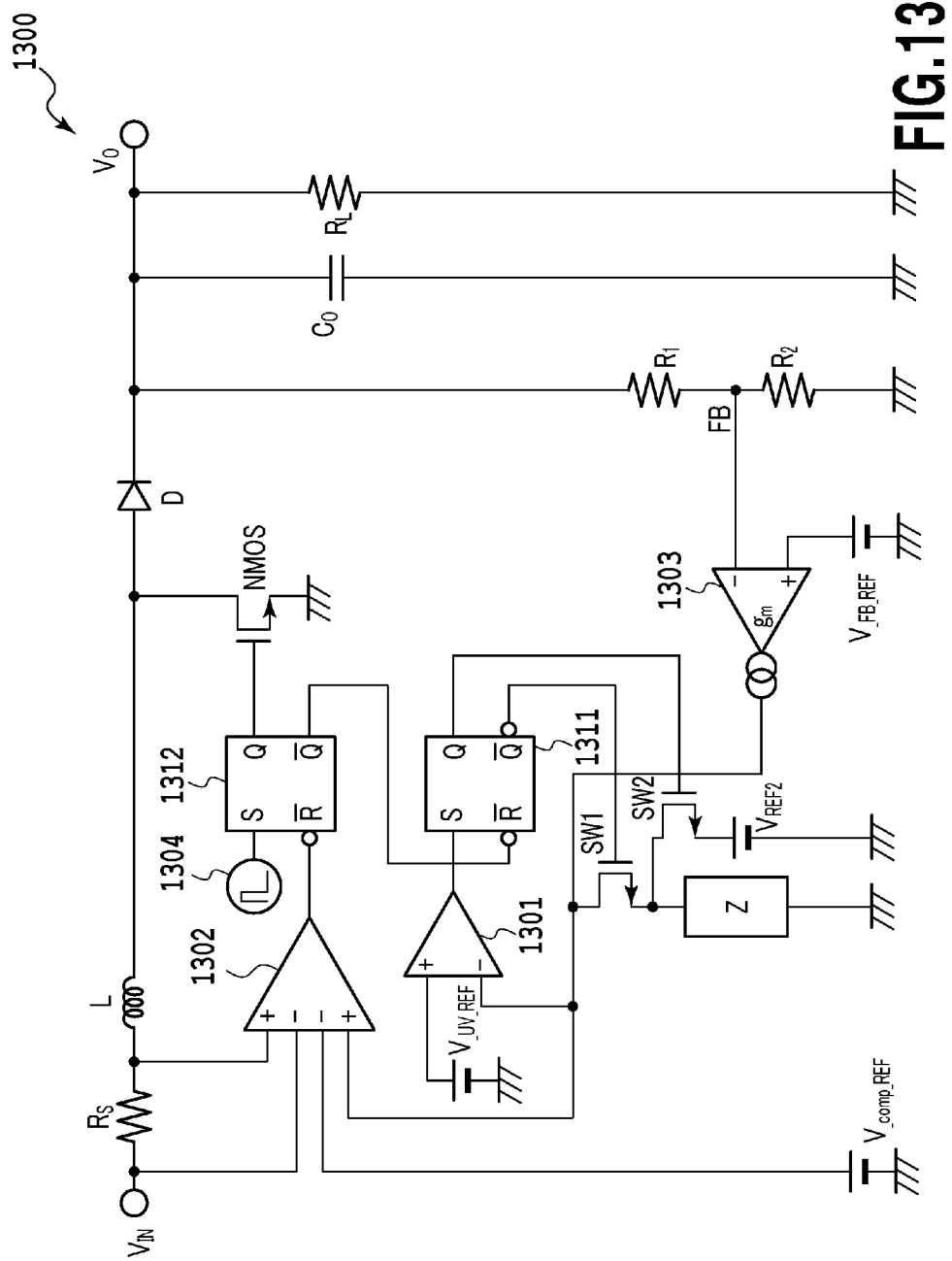
FIG. 13 A circuit diagram for another modification for the DC-DC converter of the second embodiment of the present invention.

Furthermore, the arrangement shown in FIG. 13 may also be employed.

FIG. 13 is a circuit diagram for another modification 1300 for the DC-DC converter of the second embodiment of the present invention.

In this modification, the other end of the Z referred to in the second embodiment is grounded. According to this modification, in the bypass mode, $V_{REF2}$ is set for one end of the Z, and a ground voltage is set for the other end, so that immediately after the bypass mode is changed to the boost mode, $V_{REF2}$ can be set for a node c, as well as in the second embodiment. That is, also in this modification, a switch SW2 is connected between one end of the phase compensation impedance element Z and a node that has a voltage higher than the voltage for the other end, and in the bypass mode, the voltage for one end of the Z is set higher than the voltage at the other end.

Therefore, when the mode is changed to the boost mode, the boosting operation can be performed to increase the output voltage above the predetermined voltage, and therefore, there are effects that the undershoot that is caused by changing the bypass mode to the boost mode can be further reduced.

In this modification, a voltage for one end of the phase compensation impedance element Z may be also set at least higher than the lower output voltage limit (the ground voltage in this embodiment) of the error amplifier, and a period required until the error voltage, at which the boosting operation is most discouraged, is set to zero can be reduced, and the switching operation can be immediately performed in consonance with a load current, so that the undershoot that occurs when the bypass mode is changed to the boost mode can be reduced.

As described above, according to the DC-DC converter of the present invention, since in the bypass mode, a voltage for one end of the phase compensation impedance element is set at the same level as the voltage for the other end, when the bypass mode is changed to the boost mode, a period required until an error voltage, at which the boosting operation is most discouraged, is set to zero can be eliminated, and the switching operation can be immediately performed in consonance with a load current, so that there are effects that the undershoot that is caused by changing the bypass mode to the boost mode can be reduced.

INDUSTRIAL APPLICABILITY

The DC-DC converter of the present invention can be appropriately applied for the field of power supply systems.

REFERENCE SIGNS LIST 200, 300, 1000, 1100, 1200, 1300: DC-DC converter
201, 202, 301, 302, 1001, 1002, 1101, 1102, 1201, 1202, 1301, 1302: comparator
211, 212, 311, 312, 1011, 1012, 1111, 1112, 1211, 1212, 1311, 1312: latch circuit
203, 303, 1003, 1103, 1203, 1303: error amplifier
204, 304, 1004, 1104, 1204, 1304: pulse oscillator

The invention claimed is:

1. A DC-DC converter for operating in a bypass mode of outputting the input voltage, unchanged, from an output terminal as an output voltage when an input voltage applied at an input terminal is higher than the predetermined voltage and for operating in a boost mode of increasing the input voltage and outputting the output voltage from the output terminal when the input voltage is lower than the predetermined voltage, comprising:

an error amplifier for outputting an error between an output voltage and a predetermined voltage;

a phase compensation impedance element for performing phase compensation, and for accumulating the error across one end to generate an error voltage;

a determination unit for monitoring a voltage output of the error amplifier to determine whether the voltage output of the error amplifier is higher, or lower than a reference voltage according to the predetermined voltage, and for outputting a determination signal indicating results of the determination; and a voltage setting unit comprising:

a first latch circuit for receiving the determination signal at a set terminal, and for outputting a first output signal and a second output signal having an opposite polarity of the first output signal;

a first switch, connected between an output terminal of the error amplifier and one end of the phase compensation impedance element, for receiving the second output signal and the first switch is turned on when the second output signal have the same polarity as that of the determination signal, or is turned off when the second output signal has an opposite polarity of the determination signal; and a second switch, connected between one end and the other end of the phase compensation impedance element, for receiving the first output signal and the second switch is turned on when the first output signal has the same polarity as that of the determination signal, or is turned off when the second output signal has an opposite polarity of the determination signal.

2. The DC-DC converter according to claim 1, wherein that the voltage setting unit is configured to:

set a voltage at one end of the phase compensation impedance element higher than a lower output voltage limit of the error amplifier when the determination signal indicates that the voltage output of the error amplifier is lower than the reference voltage, and cancel the setting of the voltage when the determination signal indicates that the voltage output of the error amplifier is higher than the reference voltage.

3. The DC-DC converter according to claim 1, the determination unit comprises:

a first comparator, for comparing a voltage output by the error amplifier with the reference voltage, and for outputting, when the voltage output by the error amplifier is lower than the reference voltage, the determination signal indicating that the bypass mode is currently set, or outputting, when the voltage output by the amplifier is higher than the reference voltage, the determination signal indicating that the boost mode is currently set.

4. The DC-DC converter according to claim 3, further comprising:

a PWM signal generator for outputting a PWM signal having a duty cycle according to the error voltage, wherein in the boost mode a switching operation is performed based on the PWM signal.

5. The DC-DC converter according to claim 4, wherein the PWM signal generator comprises:

a second comparator for comparing, with the error voltage, a voltage that corresponds to an input current that flows at the input terminal, and for outputting a reset signal when the error voltage is higher than the voltage that corresponds to the input current; and a second latch circuit for receiving a clock at a set terminal and receiving the reset signal at a reset terminal to output the PWM signal, and for outputting, to a reset terminal of the first latch circuit, a signal having polarity opposite to that of the PWM signal.

6. The DC-DC converter according to claim 1, wherein that the phase compensation impedance element includes resistors connected in series and a capacitor.

7. A DC-DC converter for operating in a bypass mode of outputting the input voltage, unchanged, from an output terminal as an output voltage when an input voltage applied at an input terminal is higher than the predetermined voltage and for operating in a boost mode of increasing the input voltage and outputting the output voltage from the output terminal when the input voltage is lower than the predetermined voltage, comprising:

an error amplifier for outputting an error between an output voltage and a predetermined voltage;

a phase compensation impedance element for performing phase compensation, and for accumulating the error across one end to generate an error voltage;

a determination unit for monitoring a voltage output of the error amplifier to determine whether the voltage output of the error amplifier is higher, or lower than a reference voltage according to the predetermined voltage, and for outputting a determination signal indicating results of the determination; and a voltage setting unit comprising:

a first latch circuit for receiving the determination signal at a set terminal, and for outputting a first output signal and a second output signal having an opposite polarity of the first output signal;

a first switch, connected between an output terminal of the error amplifier and one end of the phase compensation impedance element, for receiving the second output signal and the first switch is turned on when the second output signal have the same polarity as that for the determination signal, or is turned off when the second output signal has an opposite polarity of the determination signal; and a second switch, connected between one end of the phase compensation impedance element and a voltage source for generating a voltage to be set at the one end in the bypass mode, for receiving the first output signal and the second switch is turned on when the first output signal has the same polarity as that of the determination signal, or is turned off when the second output signal has an opposite polarity of the determination signal.

8. The DC-DC converter according to claim 7, wherein that the voltage setting unit is configured to:

set a voltage at one end of the phase compensation impedance element higher than a lower output voltage limit of the error amplifier when the determination signal indicates that the voltage output of the error amplifier is lower than the reference voltage, and cancel the setting of the voltage when the determination signal indicates that the voltage output of the error amplifier is higher than the reference voltage.

9. The DC-DC converter according to claim 7, the determination unit comprises:

a first comparator, for comparing a voltage output by the error amplifier with the reference voltage, and for outputting, when the voltage output by the error amplifier is lower than the reference voltage, the determination signal indicating that the bypass mode is currently set, or outputting, when the voltage output by the amplifier is higher than the reference voltage, the determination signal indicating that the boost mode is currently set.

10. The DC-DC converter according to claim 9, further comprising:

a PWM signal generator for outputting a PWM signal having a duty cycle according to the error voltage, wherein in the boost mode a switching operation is performed based on the PWM signal.

11. The DC-DC converter according to claim 10, wherein that the PWM signal generator comprises:

a second comparator for comparing, with the error voltage, a voltage that corresponds to an input current that flows at the input terminal, and for outputting a reset signal when the error voltage is higher than the voltage that corresponds to the input current; and a second latch circuit for receiving a clock at a set terminal and receiving the reset signal at a reset terminal to output the PWM signal, and for outputting, to a reset terminal of the first latch circuit, a signal having polarity opposite to that of the PWM signal.

12. The DC-DC converter according to claim 7, wherein that the phase compensation impedance element includes resistors connected in series and a capacitor.

13. A DC-DC converter for operating in a bypass mode of outputting the input voltage, unchanged, from an output terminal as an output voltage when an input voltage input at an input terminal is higher than a predetermined voltage and for operating in a boost mode of increasing the input voltage and outputting the output voltage from the output terminal when the input voltage is lower than the predetermined voltage, comprising:
- an error amplifier for outputting an error between the output voltage and the predetermined voltage;
- a phase compensation impedance element for performing phase compensation, and for accumulating the error across one end to generate an error voltage;
- a determination unit for monitoring a voltage output by the error amplifier, and for determining whether the bypass mode or the boost mode is currently set, and outputting a determination signal indicating obtained determination results;
- a first switch connected between output of the error amplifier and one end of the phase compensation impedance element; and
- a second switch connected between one end and the other end of the phase compensation impedance element,
- wherein when the determination signal indicates the bypass mode is currently set, the first switch is turned off and the second switch is turned on, or when the determination signal indicates the boost mode is currently set, the first switch is turned on and the second switch is turned off.

14. A DC-DC converter for operating in a bypass mode of outputting the input voltage, unchanged, from an output terminal as an output voltage when an input voltage input at an input terminal is higher than a predetermined voltage and for operating in a boost mode of increasing the input voltage and outputting the output voltage from the output terminal when the input voltage is lower than the predetermined voltage, comprising:
- an error amplifier for outputting an error between the output voltage and the predetermined voltage;
- a phase compensation impedance element for performing phase compensation, and accumulating the error across one end to generate an error voltage;
- a determination unit for monitoring a voltage output by the error amplifier, and for determining whether the bypass mode or the boost mode is currently set, and outputting a determination signal indicating obtained determination results;
- a first switch connected between output of the error amplifier and one end of the phase compensation impedance element;
- a second switch connected between one end of the phase compensation impedance element and a node having a voltage higher than a voltage at the other end of the phase compensation impedance element,
- wherein when the determination signal indicates the bypass mode is currently set, the first switch is turned off and the second switch is turned on, or when the determination signal indicates the boost mode is currently set, the first switch is turned on and the second switch is turned off.

* * * * *